United States Patent [19]

Davis et al.

[11] Patent Number: 5,102,097
[45] Date of Patent: Apr. 7, 1992

[54] BUTTERFLY VALVE WITH PLURAL-FENCE MODULATOR PLATE

[75] Inventors: Brian K. Davis, Tempe; Marshall U. Hines, Scottsdale; Larry K. Ball, Chandler; Stephan R. Cronenberg, Mesa, all of Ariz.

[73] Assignee: Allied-Signal Inc., Morris Township, Morris County, N.J.

[21] Appl. No.: 685,595

[22] Filed: Apr. 12, 1991

Related U.S. Application Data

[63] Continuation-in-part of Ser. No. 572,202, Aug. 23, 1990, abandoned, which is a continuation-in-part of Ser. No. 451,659, Dec. 15, 1989, abandoned.

[51] Int. Cl.⁵ .............................................. F16K 1/22
[52] U.S. Cl. ..................................... 251/283; 251/305
[58] Field of Search ....................... 251/281, 283, 305

[56] References Cited

U.S. PATENT DOCUMENTS

| | | | |
|---|---|---|---|
| 2,095,263 | 10/1937 | Moss .................................. | 251/283 |
| 2,271,390 | 1/1942 | Dodson ............................... | 251/283 |
| 3,442,489 | 5/1969 | Cary et al. ....................... | 251/305 X |
| 3,516,640 | 6/1970 | Bryer et al. ......................... | 251/305 |
| 3,960,177 | 6/1976 | Baumann ............................. | 251/305 |

FOREIGN PATENT DOCUMENTS

| | | | |
|---|---|---|---|
| 931670 | 7/1946 | France . | |
| 1533073 | 11/1978 | United Kingdom ................ | 251/305 |

Primary Examiner—Robert G. Nilson
Attorney, Agent, or Firm—Joseph R. Black; James W. McFarland; Robert A. Walsh

[57] ABSTRACT

A flow modulator (48) for a butterfly valve (40) incorporates a first protrusion (64) on the high-pressure side (52) of the modulator and a second protrusion (66) on the low-pressure side (54). The second protrusion (66) is spaced from the leading edge (60) to define a surface portion (88) of the low-pressure side (54). In operation, the second protrusion (66) functions as a flow restrictor that increases pressure in a region (86) of the flow path (44) bordered in part by the second protrusion and the surface portion (88). This increase in pressure serves to minimize the net aerodynamically-induced closing torque exerted on the modulator (46). The height of the second protrusion and its distance from the leading edge are shown to be important design parameters. In addition, the use of a third protrusion (114) for reducing torque drop-off at high rotational angles is disclosed.

22 Claims, 5 Drawing Sheets

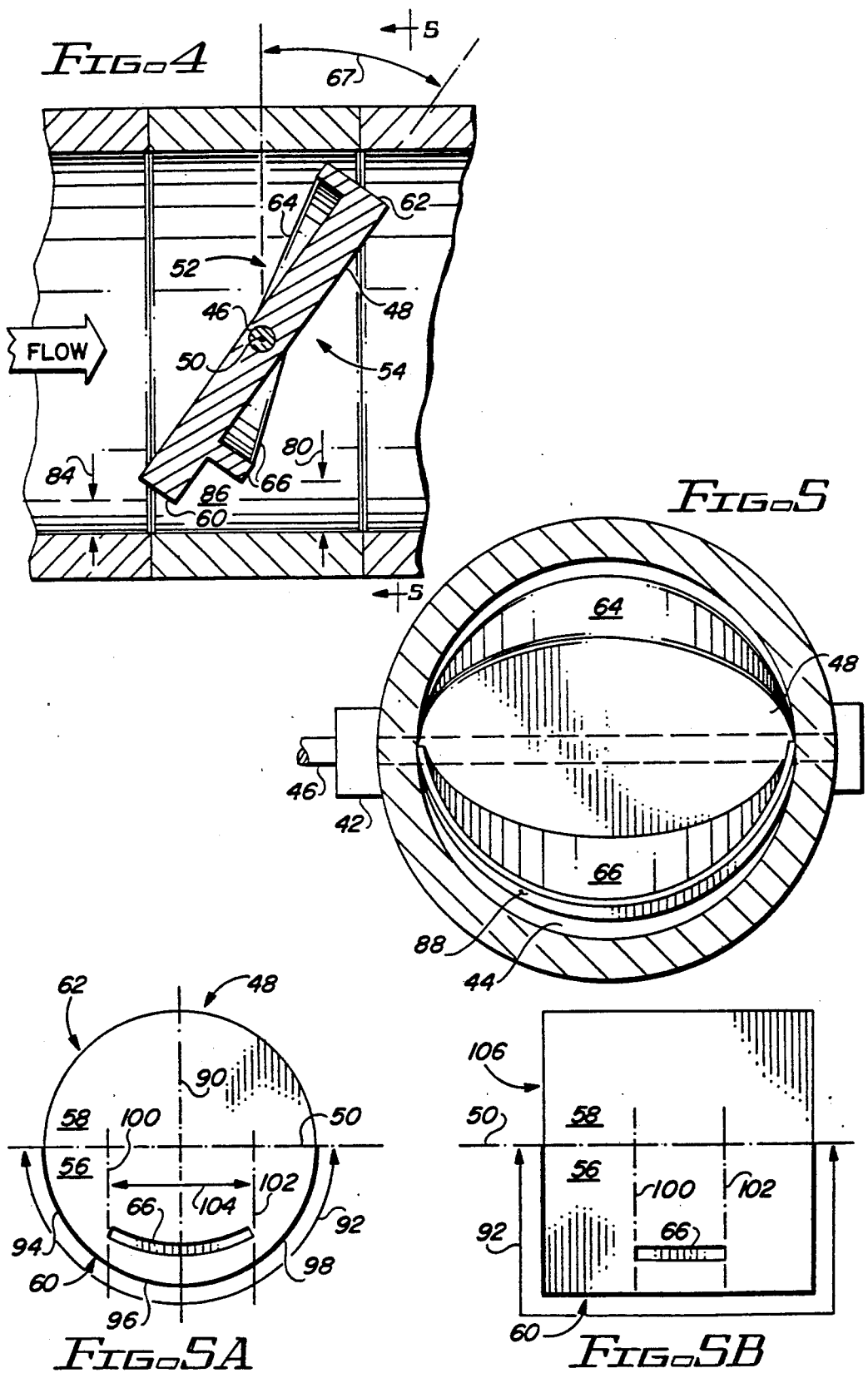

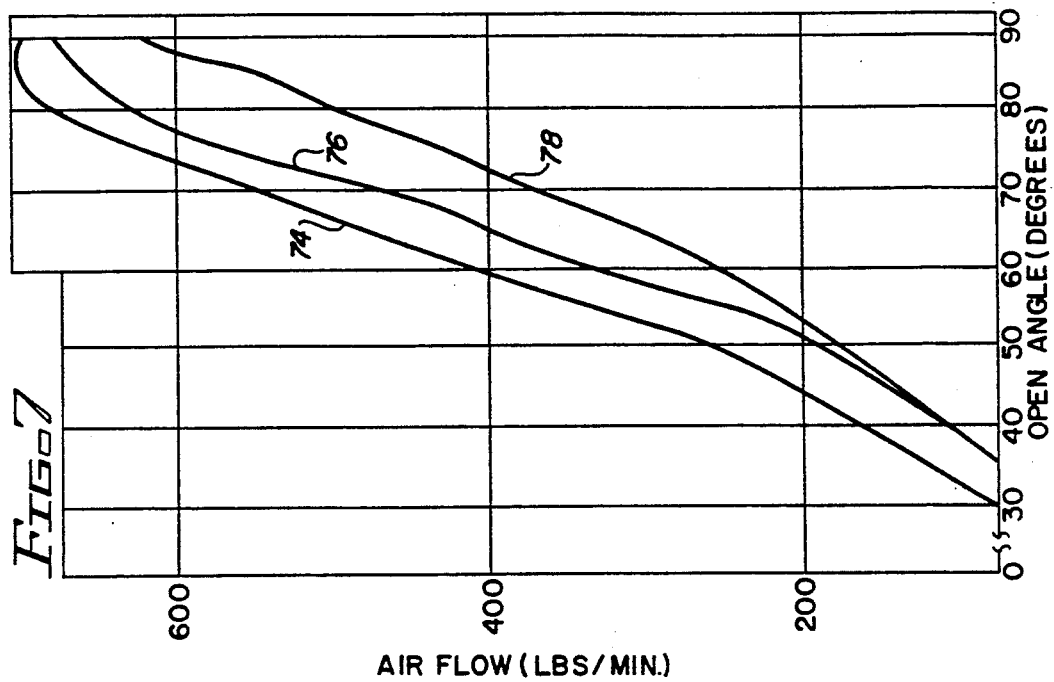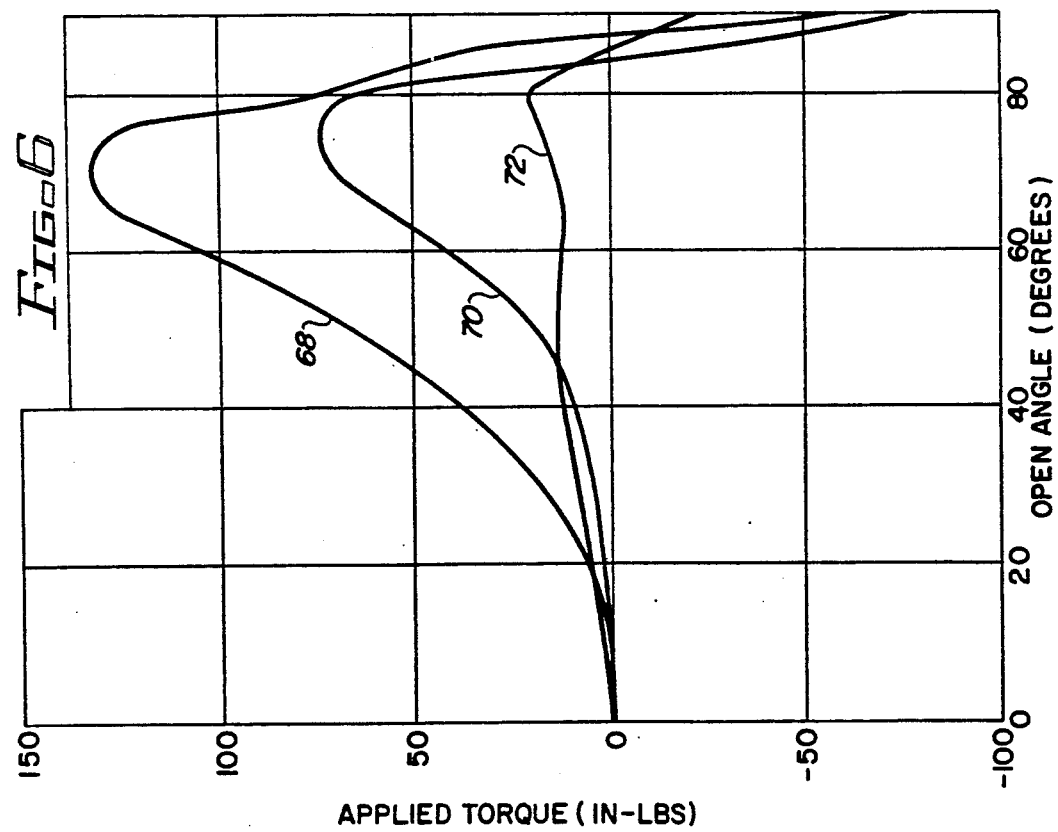

BUTTERFLY VALVE WITH PLURAL-FENCE MODULATOR PLATE

This application is a continuation-in-part of application Ser. No. 572,202, which was filed on Aug. 23, 1990, now abandoned. The latter application is a continuation-in-part of application Ser. No. 451,659 which was filed on Dec. 15, 1989, now abandoned.

TECHNICAL FIELD

The present invention pertains generally to valves and more specifically to those which employ plate-like members as flow modulators. Still more specifically, the invention pertains to such modulators that incorporate protrusions or functionally similar components to minimize aerodynamic or hydrodynamic torque.

BACKGROUND OF THE INVENTION

FIG. 1 of the accompanying drawings schematically illustrates a conventional butterfly valve 10. A rotatable shaft 12 extending through a plate-type flow modulator 14 is supported by a mounting body 16. The mounting body 16 forms part of a duct 18 which defines a flow path 20. Flow proceeds in the direction indicated by the arrow 22. When the modulator 14 is in an open position as illustrated, high-pressure fluid exerts a closing torque on the high-pressure side 24 of the modulator. If static pressure is measured at several locations from the leading edge 26 to the trailing edge 28 of the modulator 14, it is observed that the pressure is substantially uniform over a range represented by a series of equal-length arrows 30. A drop-off in static pressure is observed over a smaller range near the trailing edge 28, this being represented by a series of arrows 32 having successively smaller lengths. This drop-off in pressure apparently accounts for the closing torque exerted on the modulator 14 by the high-pressure fluid. In order to maintain the position of the modulator 14, an opening torque must be continuously applied to the shaft 12. Typically, the torque is applied to the shaft 12 by an external actuator (not shown). If torque exerted by the fluid can be sufficiently decreased by changing the design of the modulator 14, then a smaller actuator may be used to provide opening torque. This is particularly important in applications such as cabin pressurization systems for aircraft, where weight and volume reduction is an ongoing goal.

A known expedient for significantly reducing the closing torque exerted by the fluid is to provide a protruding portion 34 (hereinafter "trailing fence") of the modulator 14 on the high-pressure side 24 near the trailing edge 28, as illustrated in FIG. 1A. The trailing fence 34 effectively reduces the range over which the pressure drop-off represented by the arrows 32 (FIG. 1) is observed.

In addition, it is known that closing torque can be altered by providing a protruding portion 36 (hereinafter "leading fence") on the low-pressure side 38 of the modulator 14 near the leading edge 26. However, the use of such a leading fence 36 alone (i.e. without a trailing fence 34) has been avoided because closing torque is thereby increased. When used in combination with a trailing fence 34 as illustrated in FIG. 1A, the leading fence 36 generally increases closing torque over that obtained through use of the trailing fence 34 only, and only slightly decreases closing torque under that obtained with a conventional modulator having no fences. However, this slight reduction is achieved at the expense of a considerable reduction in flow rate. Accordingly, the use of a leading fence 36 has not been well received either alone or in combination with a trailing fence 34.

An objective of the invention is to provide a plural-fence, plate-type flow modulator for a butterfly valve whereby in operation of the valve a substantial reduction in the aerodynamic or hydrodynamic torque exerted on the modulator is realized.

SUMMARY OF THE INVENTION

This invention achieves the above-stated objective by providing a plural-fence, plate-type flow modulator including a leading fence that is spaced from the leading edge of the modulator. The leading fence is so spaced from the leading edge and so dimensioned as to function in use as a flow restrictor when the modulator is in a rotational position of sufficiently high open angle. Since the leading fence is spaced from the leading edge, there is defined between the fence and the edge a surface portion of the low-pressure side of the modulator. When the leading fence functions as a flow restrictor, there is a resulting increase in pressure in a region of the flow path bounded in part by the leading fence and the forementioned surface portion. This increased pressure, acting on the surface portion, results in a net aerodynamically-induced closing torque which is considerably lower than that which would take place without the leading fence. Since the effect of the leading fence as a flow restrictor accounts for the torque-reduction phenomenon, both the average height of the fence and its average distance from the leading edge are important parameters in minimizing torque. It also appears that the relative heights of the leading and trailing fences is an important parameter, and that there are cross-correlation effects among the above-mentioned parameters. The invention is in part directed to the optimization of these parameters for a dual-fence modulator.

The invention is also directed to minimizing or eliminating torque drop-off at high rotational angles of the modulator. This is accomplished by providing between the leading and trailing fences a stabilizing fence protruding from the high-pressure side of the modulator. Preferably, the stabilizing fence is nominally located so that its longitudinal axis lies in a plane parallel to the axis about which the modulator is rotatable, and perpendicular to a diametral line extending through the modulator.

BRIEF DESCRIPTION OF THE DRAWINGS

FIG. 4 is a cross-sectional view as in FIG. 2, illustrating the modulator of the butterfly valve in an open position.

FIG. 5 is an elevational view as in FIG. 3 and is taken along line 5—5 of FIG. 4.

FIGS. 5A and 5B are partially elevational and partially diagrammatic views of disc-shaped and rectangular-shaped flow modulators, respectively.

FIG. 6 is a graph of applied torque versus open angle for three different butterfly valve configurations, one of which incorporates the present invention.

FIG. 7 is a graph of flow rate versus open angle for the same three butterfly valve configurations mentioned in the above description of FIG. 6.

DESCRIPTION OF THE PREFERRED EMBODIMENT

Figure 1:
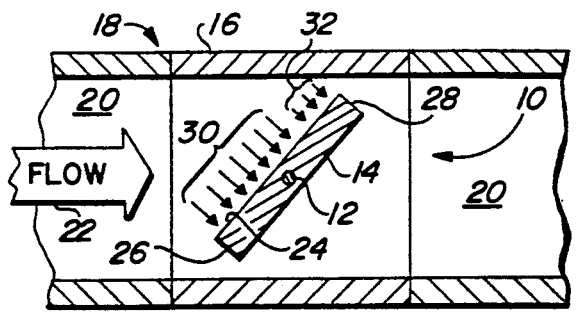
FIG. 1 is a cross-sectional and somewhat diagrammatic view of a conventional butterfly valve.
Figure 1A:
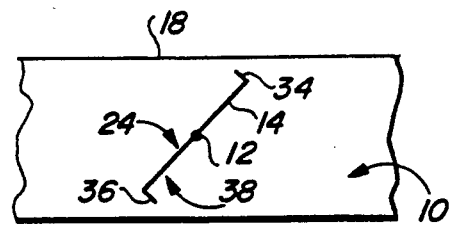
FIG. 1A is a schematic illustration of a known dual-fence butterfly valve.
Figure 2:
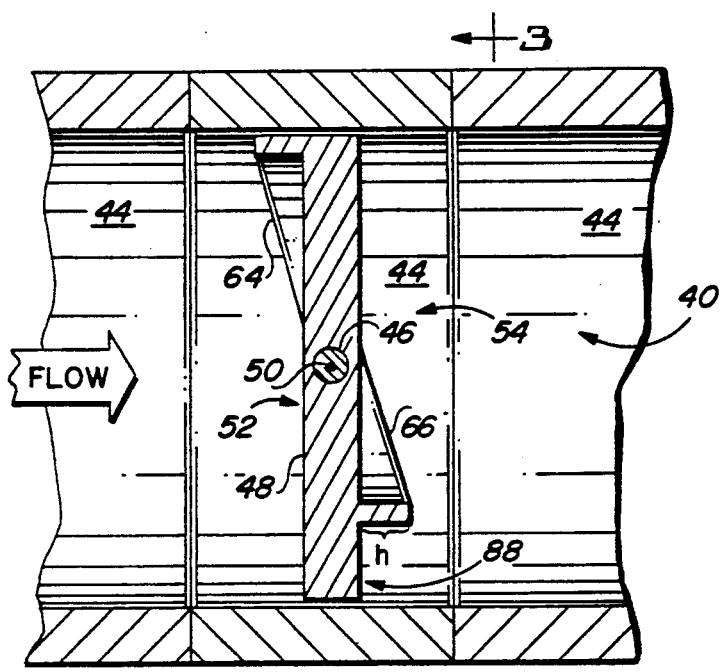
FIG. 2 is a cross-sectional view of a butterfly valve according to the invention.

Referring to FIG. 2, the numeral 40 designates a butterfly valve. The butterfly valve 40 comprises a duct member or mounting body 42 which defines a flow path 44, a rotatable shaft 46 spanning the flow path and being supported by the mounting body 42, and a plate-like flow modulator 48 that substantially spans the flow path and is rotatable therein. Typically, a rim seal (not shown) is provided on the modulator 48 to close fluid communication along the flow path 44 when the modulator is in its closed position as illustrated. The shaft 46 extends through the modulator 48 as indicated, and is secured in fixed relationship thereto so that the modulator rotates with the shaft when the latter is rotated about its longitudinal axis 50. To facilitate the rotational movement, bearings (not shown) are provided on the shaft 46 where the latter is supported by the mounting body 42. The modulator 48 has a high-pressure side 52 adapted to face upstream in relation to the flow path 44, and a low-pressure side 54 adapted to face downstream.

Figure 3:
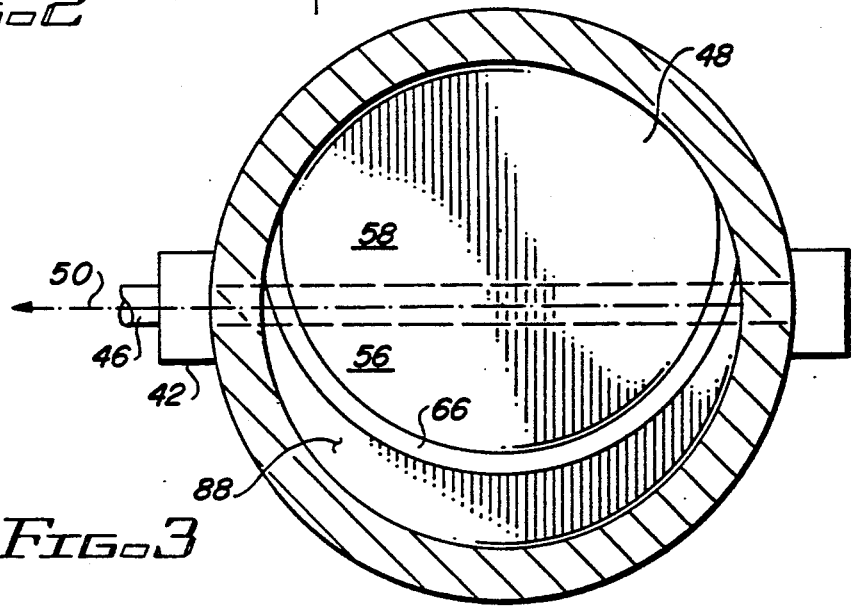
FIG. 3 is an elevational view taken along line 3—3 of FIG. 2.

Viewing the low-pressure side 54 of the modulator 48 as indicated in FIG. 2 and as seen in FIG. 3, and referring also to FIGS. 4 and 5A, it can be seen that the longitudinal axis 50 of the shaft 46 geometrically divides the modulator 48 into two spatial sections, which are denoted herein as a leading section 56 and a trailing section 58. Thus, when opening torque is applied to the shaft 46, the modulator 48 moves from its zero-angle closed position (indicated by FIGS. 2 and 3) to an open position, and the leading section 56 is then upstream from the longitudinal axis 50, whereas the trailing section 58 is downstream from the axis. The leading section 56 is circumscribed by a leading edge 60 (indicated in FIG. 5A by a bold-line semicircle), whereas the trailing section 58 is circumscribed by a trailing edge 62.

Referring now to FIGS. 2 through 5A, the modulator 48 has a first protrusion or trailing fence 64 on the high-pressure side 52, the fence being located near the trailing edge 62. In general, it is best to locate the trailing fence 64 as near the trailing edge 62 as possible so that the former effectively becomes an extension of the latter. The modulator 48 also has a second protrusion or leading fence 66 on the low-pressure side 54, the leading fence being spaced from the leading edge 60. The leading and trailing fences 64,66 are rigidly secured to the remainder of the modulator by any suitable means, such as welding, or may be integral portions of an integrally-formed modulator. In applications demanding noise reduction, a multiplicity of holes (not shown) are formed through each of the fences 64,66. Spacing the leading fence 66 from the leading edge 60 has proven to be an important structural feature for otherwise conventional butterfly valves which incorporate fences. The apparent reason that such spacing is important is discussed hereinafter.

FIG. 6 is a graph of applied torque (i.e. torque applied to the shaft 46 to overcome aerodynamic torque exerted on the modulator 48) versus open angle (i.e. the rotational position of the modulator 48 as indicated generally by the numeral 67 in FIG. 4). Three curves 68,70,72 are indicated and are derived from actual test data. As tested, the butterfly valve 40 comprised a disc-shaped aluminum modulator having a diameter of approximately 20.3 centimeters. The pressure drop across the modulator was approximately 4 kPa (0.6 psi) at an open angle of ninety degrees when tested without fences, and was approximately 6 kPa (0.9 psi) at an open angle of ninety degrees when tested with one or both fences 64,66. Curve 68 is derived from data obtained with neither the leading fence 66 nor the trailing fence 64 in place. Curve 70 is derived from data obtained with the trailing fence 64 in place, but without a leading fence 66. Curve 72 is derived from data obtained with both fences 64,66 in place. The leading fence 66 was spaced approximately 2.38 centimeters from the leading edge 60, and had a height of approximately 2.79 centimeters throughout its length. The leading fence 66 was centered relative to the circumferential range defined by the leading edge 60, and covered approximately seventy percent of said range.

FIG. 7 illustrates the relationship between air flow and open angle for the three above-described modulator configurations. Curves 74,76, and 78 correspond to curves 68,70, and 72 in FIG. 6, respectively, and are also derived from actual test data.

Referring now to FIGS. 4, 6, and 7 since the leading fence 66 is spaced from the leading edge 60, its effect in restricting flow is relatively insignificant at low open angles 67. In fact, over some range of low open angles 67, flow restriction is substantially uninfluenced by the leading fence 66, as can be seen by comparing curves 76 and 78. However, at some critical angle which depends upon both the height ("h" in FIG. 2) of the leading fence 66 and its position in relation to the leading edge 60, the leading fence becomes significant in restricting flow. It is believed that this critical angle occurs when the distance (indicated by arrows 80) between the leading fence 66 and the inner wall 82 of the duct is approximately the same as the distance (indicated by arrows 84) between the leading edge 60 and the inner wall. As the leading fence 66 becomes a significant flow restrictor, an increase in pressure occurs in a region 86 bordered in part by the fence and by that surface portion 88 (FIG. 2) of the low-pressure side 54 between the leading fence and the leading edge 60. It will be understood that fluid in this region 86 exerts a relatively small closing torque on the modulator 48 via action on the leading fence 66, whereas it exerts a relatively large opening torque on the modulator via action on the forementioned portion 88 (FIG. 2) of the low-pressure side 54. This apparently accounts for the results shown by curve 72.

Figure 8:
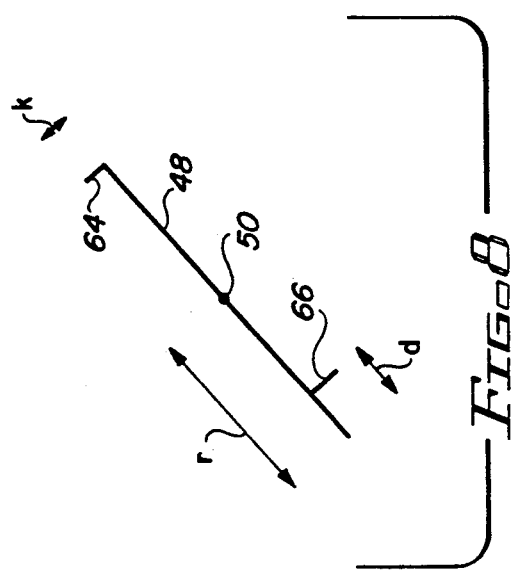
FIG. 8 is a diagrammatic illustration employed to aid description of the above-mentioned average height and average distance parameters.

Viewing FIGS. 2 and 8, the average distance "d" between the leading edge 60 and leading fence 66 and the height "h" of the latter determine the open angle at which the fence becomes a significant flow restrictor. In addition, these parameters, as they relate to the distance "r" between the longitudinal axis 50 and the leading edge 60, affect torque characteristics over a broad range of open angles. Curves 108, 110, 112 in FIG. 9 were derived from data obtained during a test of a butterfly valve having a circular modulator 48 of 12.45 cm diameter with a centered rotational axis. That is, "r" was approximately 6.22 cm. In the zero to forty-degree range of open angles, curve 112 is substantially the same as curve 108. The height "k" of the trailing fence 64 was 1.27 cm in all cases. The heights "h" of the leading fence 66 were 1.27 cm (curve 108), 1.91 cm (curve 110), and 2.54 cm (curve 112). The average distances "d" were 1.12 cm (curve 108) and 0.76 cm (curves 10, 112). These yield the following ratio data:

|  | h/r | d/r |
| --- | --- | --- |
| curve 108 | .204 | 0.18 |
| curve 110 | .306 | 0.12 |
| curve 112 | .408 | 0.12 |

In addition to spanning a greater range of the low-pressure side 54, the modulator 48 illustrated in FIGS. 2-5 differs from that tested in that neither of the fences 64,66 is of uniform height. Each fence has a maximum height at its center that converges to a minimum height (essentially zero) at its ends. It is postulated that turbulence can be minimized by avoiding sharp corners that are necessarily formed at the ends of fences which have uniform height. However, the importance of accomplishing such has not been established. Furthermore, it appears that certain portions of the fences 64,66 are more influential than others. On the latter point, attention is now directed to FIG. 5A.

In FIG. 5A, the bold-line semicircle represents the leading edge 60 of the modulator 48. A central point of the leading edge 60, in cooperation with the longitudinal axis 50 of the shaft 46 (FIG. 2), defines a geometric bisector 90 of the low-pressure side 54 (FIG. 5), the bisector being perpendicular to the axis. The length (indicated by arrow 92) of the leading edge is shown divided into three equal-length portions 94,96,98. The ends of the centrally-disposed portion 96 define two points that in turn cooperate with the longitudinal axis 50 to define two parallel lines 100,102, both being perpendicular to the axis. Since flow proceeds generally in the direction of the bisector 90, any segments of a leading fence that extend in the general direction of the leading edge portions 94 and 98 will be less influential in restricting flow than will a segment that extends in the general direction of the centrally-disposed portion 96. Accordingly, the advantages provided by the invention should be obtainable by use of a leading fence 66 which spans a substantially long, centrally-disposed range 104 of the low-pressure side 54.

FIG. 5B illustrates a rectangularly-shaped flow modulator 106. From the foregoing, it should be clear that the invention is also applicable to butterfly valves which incorporate modulators of that shape.

Figure 9:
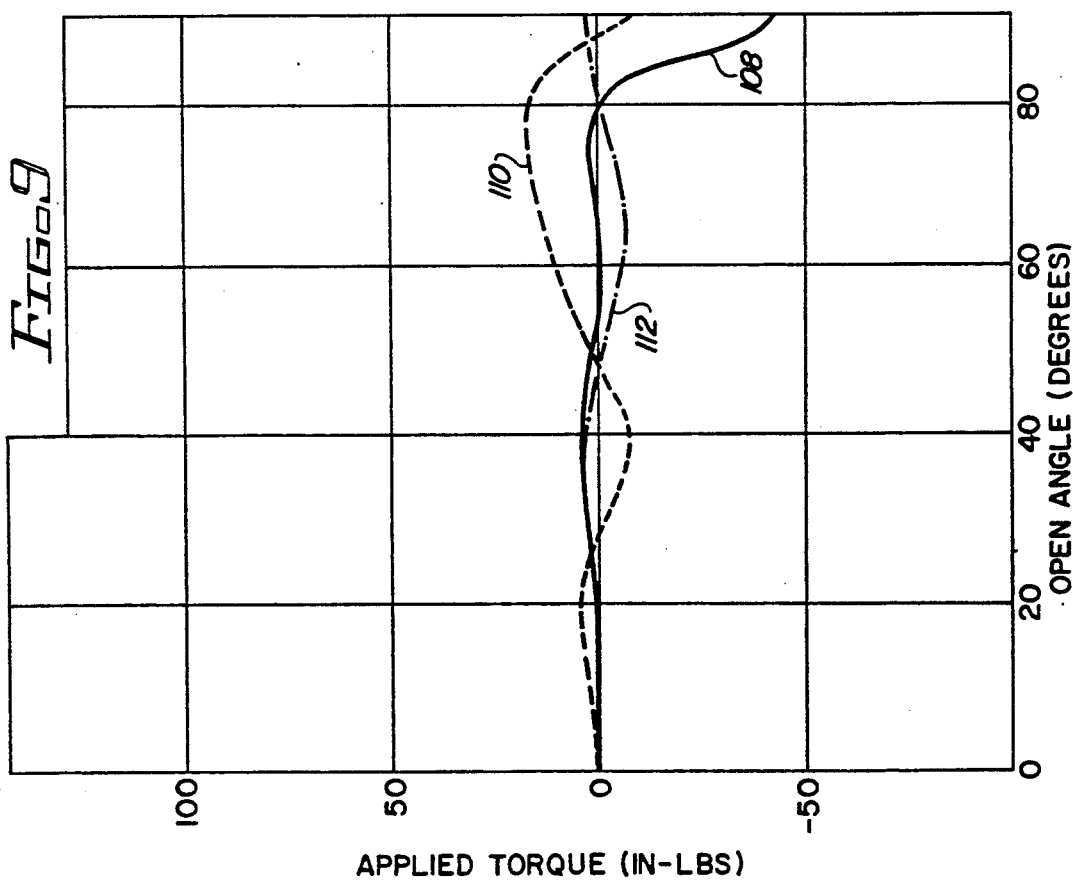
FIG. 9 is a graph as in FIG. 6, and illustrates various torque curves for various sets of the above-described parameters.
Figure 10:
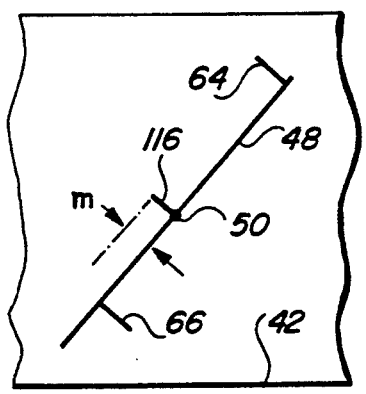
FIG. 10 is a diagrammatic illustration as in FIG. 8, showing the above-mentioned stabilizing fence.

It should be observed that in FIG. 9 curves 108 and 110 show the characteristic drop-off in torque at rotational angles in excess of about eighty degrees, whereas curve 112 remains stable. This result appears highly dependent on pressure drop. However, success at minimizing or eliminating the abrupt torque drop-off over a range of pressure drops has been achieved by the use of a stabilizing fence. As is illustrated in FIG. 10, the stabilizing fence 116 extends from the high-pressure side 52 to a distance, "m", determined in a direction perpendicular to the plate 48. Preferably, the fence 116 is positioned equidistant from the leading and trailing edges.

Figure 11A:
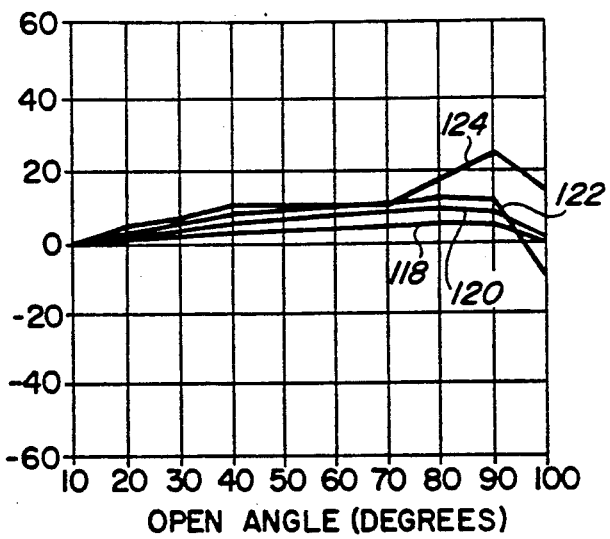
FIGS. 11(a)-11(c) are graphs as in FIG. 9, and illustrate torque curves for various heights of the stabilizing fence shown in FIG. 10.
Figure 11B:
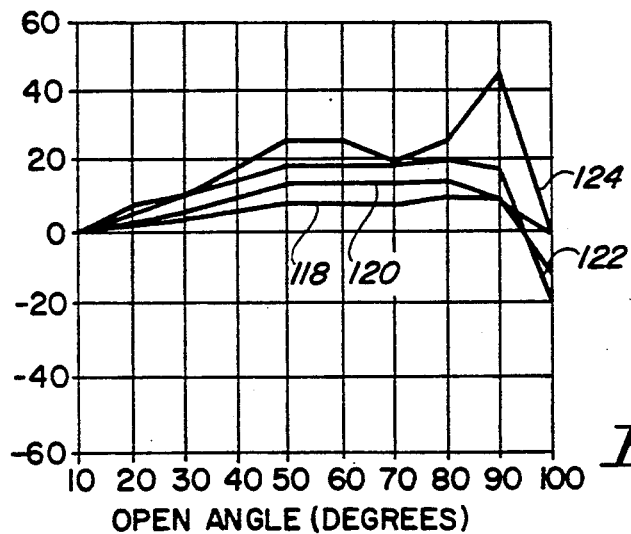
Figure 11C:
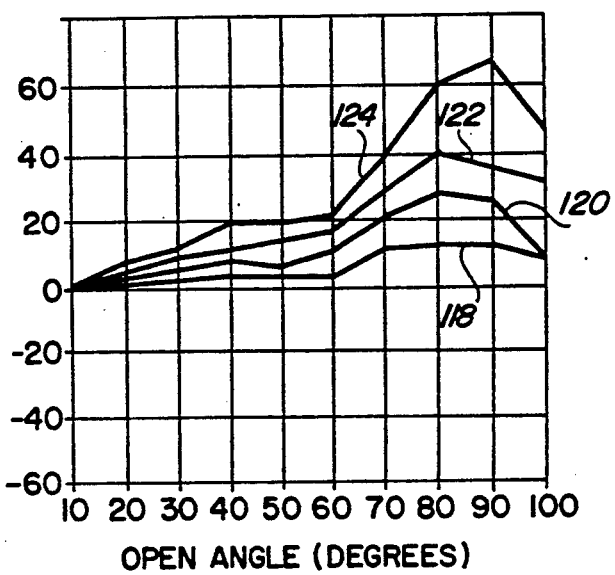

In FIGS. 11(a)-11(c), curves 118, 120, 122, and 124 are derived from actual test data at gauge pressure drops of 6.9 KPa, 13.8 KPa, 20.7 KPa, and 27.6 KPa, respectively. The modulator plate 48 had a diameter of 20 cm ("r"=10 cm). The height, "k", of the trailing fence 64 was 1.91 cm, and the height, "h", of the leading fence 66 was 2.22 cm in all cases. The trailing fence 64 was spaced from the trailing edge by 0.254 cm to prevent interference with the duct member 42. The variables were the height, "m", of the stabilizing fence 116, and the average distance, "d", of the leading fence 66 from the leading edge, as indicated by the following table:

|  | FIG. 11(a) | FIG. 11(b) | FIG. 11(c) |
| --- | --- | --- | --- |
| d | 2.29 cm | 2.59 cm | 2.29 cm |
| m | 1.27 cm | 1.27 cm | 2.54 cm |
| d/r | 0.23 | 0.26 | 0.23 |
| m/r | 0.13 | 0.13 | 0.25 |
| m/k | 0.67 | 0.67 | 1.33 |

As is evident from a comparison of FIGS. 11(a) and 11(c), a reduction in "m" to a height below "k" with the ratio d/r held constant yielded considerable reduction in torque for all curves, while substantially eliminating the torque drop-off associated with curve 122 in the 80-90 degree range of open angles. Substantially the same result, to a lesser degree, was obtained when the same reduction was accompanied by a slight increase in "d", as is evident from a comparison of FIGS. 11(b) and 11(c). A comparison of FIGS. 11(a) and 11(b) again illustrates the sensitivity of the overall torque curve to the ratio d/r.

The foregoing portion of the description, which includes the accompanying drawings, is not intended to restrict the scope of the invention to the preferred embodiment thereof, or to specific details which are ancillary to the teaching contained herein. The invention should be construed in the broadest manner which is consistent with the following claims and their equivalents.

What is claimed is:

1. A butterfly valve, comprising:
   a mounting body defining a flow path;
   a shaft rotatably supported by said mounting body and spanning said flow path, said shaft defining a longitudinal axis thereof;
   a plate-like flow modulator substantially spanning said flow path and being secured to said shaft so that said modulator rotates with said shaft when the latter is rotated about its longitudinal axis, said modulator having a high-pressure side adapted to face upstream and a low-pressure side adapted to face downstream, said longitudinal axis defining first and second sections of said modulator whereby if said modulator is in an open rotational position said first section is upstream from said axis and said second section is downstream from said axis, said first and second sections being circumscribed by leading and trailing edges, respectively, of said modulator, said modulator having a first protrusion located near said trailing edge and extending from said high-pressure side, said modulator having a second protrusion spaced from said leading edge and extending from said low-pressure side to a distance "h" determined in a direction perpendicular to said modulator, said leading edge cooperating with said longitudinal axis to define a central bisector of said modulator that is perpendicular to said longitudinal axis, said axis and said leading edge cooperating to define a distance "r" extending therebetween and along said bisector, the ratio of the distance "h" to the distance "r" being about 0.4.

2. The invention of claim 1 wherein said second protrusion is spaced from said leading edge by an average distance "d", the ratio of the average distance "d" to the distance "r" being in a range extending from about 0.12 to about 0.18.

3. The invention of claim 2 wherein said first protrusion extends from said high-pressure side to a distance "k" determined in a direction perpendicular to said modulator, said distance "h" exceeding said distance "k".

4. A butterfly valve, comprising:
a mounting body defining a flow path;
a shaft rotatably supported by said mounting body and spanning said flow path, said shaft defining a longitudinal axis thereof;
a plate-like flow modulator substantially spanning said flow path and being secured to said shaft so that said modulator rotates with said shaft when the latter is rotated about its longitudinal axis, said modulator having a high-pressure side adapted to face upstream and a low-pressure side adapted to face downstream, said longitudinal axis defining first and second sections of said modulator whereby if said modulator is in an open rotational position said first section is upstream from said axis and said second section is downstream from said axis, said first and second sections being circumscribed by leading and trailing edges, respectively, of said modulator, said modulator having a first protrusion located near said trailing edge and extending from said high-pressure side to a distance "k" determined in a direction perpendicular to said modulator, said modulator having a second protrusion spaced from said leading edge by an average distance "d" and extending from said low-pressure side of said first section to a distance "h" determined in a direction perpendicular to said modulator, said modulator having a third protrusion extending from said high-pressure side to a distance "m" determined in a direction perpendicular to said modulator, said leading edge cooperating with said longitudinal axis to define a central bisector of said modulator that is perpendicular to said longitudinal axis, said axis and said leading edge cooperating to define a distance "r" extending therebetween and along said bisector, the ratio of the distance "d" to the distance "r" being in a range extending from about 0.12 to about 0.26.

5. The invention of claim 4 wherein the distance "h" exceeds the distance "k".

6. The invention of claim 5 wherein the distance "k" exceeds the distance "m".

7. The invention of claim 6 wherein the ratio of the distance "h" to the distance "r" is in a range extending from 0.204 to 0.408.

8. The invention of claim 7 wherein the distance "h" exceeds the distance "k" by at least twenty-five percent.

9. The invention of claim 8 wherein the ratio of the distance "d" to the distance "r" is in a range extending from 0.20 to 0.26.

10. A butterfly valve, comprising:
a mounting body defining a flow path;
a shaft rotatably supported by said mounting body and spanning said flow path, said shaft defining a longitudinal axis thereof;
a plate-like flow modulator substantially spanning said flow path and being secured to said shaft so that said modulator rotates with said shaft when the latter is rotated about its longitudinal axis, said modulator having a high-pressure side adapted to face upstream and a low-pressure side adapted to face downstream, said longitudinal axis defining first and second sections of said modulator whereby if said modulator is in an open rotational position said first section is upstream from said axis and said second section is downstream from said axis, said first and second sections being circumscribed by leading and trailing edges, respectively, of said modulator, said modulator having a first protrusion located near said trailing edge and extending from said high-pressure side, said modulator having a second protrusion spaced from said leading edge and extending from said low-pressure side of said first section to a distance "h" determined in a direction perpendicular to said modulator, said leading edge cooperating with said longitudinal axis to define a central bisector of said modulator that is perpendicular to said longitudinal axis, said axis and said leading edge cooperating to define a distance "r" extending therebetween and along said bisector, the ratio of the distance "h" to the distance "r" being in a range extending from about 0.204 to about 0.408, said modulator having a third protrusion extending from said high-pressure side and located substantially equidistant from said leading and trailing edges, said modulator being rotatable about said longitudinal axis over an angular range extending from a position at which said modulator would close fluid communication along said flow path to a second position at which said modulator is substantially parallel to said flow path, said modulator being operative, when subjected to a set closing torque exerted thereon by fluid flowing along said flow path, to maintain a positive value for said net torque at all positions between said second position and a third position located ten degrees from said second position as determined in a direction extending toward said first position; said modulator also being operative when subjected to said net torque to maintain the latter at levels which are substantially lower than those which would obtain absent said second protrusion.

11. A butterfly valve, comprising:
a mounting body defining a flow path;
a shaft rotatably supported by said mounting body and spanning said flow path, said shaft defining a longitudinal axis thereof;
a plate-like flow modulator substantially spanning said flow path and being secured to said shaft so that said modulator rotates with said shaft when the latter is rotated about its longitudinal axis, said modulator having a high-pressure side adapted to face upstream and a low-pressure side adapted to face downstream, said longitudinal axis defining first and second sections of said modulator whereby if said modulator is in an open rotational position said first section is upstream from said axis and said second section is downstream from said axis, said first and second sections being circumscribed by leading and trailing edges, respectively, of said modulator, said modulator having a first protrusion located near said trailing edge and extending from said high-pressure side, said modulator having a second protrusion spaced from said leading edge and extending from said low-pressure side of said first section to a distance "h" determined in a direction perpendicular to said modulator, said leading edge cooperating with said longitudinal axis to define a central bisector of said modulator that is perpendicular to said longitudinal axis, said axis and said leading edge cooperating to define a distance "r" extending therebetween and along said bisector, the ratio of the distance "h" to the distance "r" being in a range extending from about 0.204 to about 0.408, said first protrusion extending from said high-pressure side to a distance "k" determined in a direction perpendicular to said modulator, said distance "h" exceeding said distance "k".

12. The invention of claim 11 wherein said distance "h" is at least twenty-five percent greater than said distance "k".

13. The invention of claim 12 wherein said distance "h" is at least fifty percent greater than said distance "k".

14. The invention of claim 11 wherein said modulator has a third protrusion extending from said high-pressure side to a distance "m" determined in a direction perpendicular to said modulator, said distance "k" exceeding said distance "m".

15. The invention of claim 14 wherein said second protrusion is spaced from said leading edge by an average distance "d", the ratio of the average distance "d" to the distance "r" being less than about 0.26 but greater than about 0.12.

16. The invention of claim 14 wherein the ratio of said distance "m" to said distance "k" is about 0.66.

17. The invention of claim 11 wherein said second protrusion is spaced from said leading edge by an average distance "d", the ratio of the average distance "d" to the distance "r" being about 0.2.

18. A butterfly valve, comprising:
a mounting body defining a flow path;
a shaft rotatably supported by said mounting body and spanning said flow path, said shaft defining a longitudinal axis thereof;
a plate-like flow modulator substantially spanning said flow path and being secured to said shaft so that said modulator rotates with said shaft when the latter is rotated about its longitudinal axis, said modulator having a high-pressure side adapted to face upstream and a low-pressure side adapted to face downstream, said longitudinal axis defining first and second sections of said modulator whereby if said modulator is in an open rotational position said first section is upstream from said axis and said second section is downstream from said axis, said first and second sections being circumscribed by leading and trailing edges, respectively, of said modulator, said modulator having a first protrusion located near said trailing edge and extending from said high-pressure side, said modulator having a second protrusion spaced from said leading edge and extending from said low-pressure side of said first section to a distance "h" determined in a direction perpendicular to said modulator, said leading edge cooperating with said longitudinal axis to define a central bisector of said modulator that is perpendicular to said longitudinal axis, said axis and said leading edge cooperating to define a distance "r" extending therebetween and along said bisector, the ratio of the distance "h" to the distance "r" being in a range extending from about 0.204 to about 0.408, said second protrusion being spaced from said leading edge by an average distance "d", the ratio of the average distance "d" to the distance "r" being in a range extending from about 0.12 to about 0.23.

19. The invention of claim 18 wherein said first protrusion extends from said high-pressure side to a distance "k" determined in a direction perpendicular to said modulator, said distance "h" exceeding said distance "k".

20. The invention of claim 19 wherein said modulator has a third protrusion extending from said high-pressure side and located substantially equidistant from said leading and trailing edges.

21. A butterfly valve, comprising:
a mounting body defining a flow path;
a shaft rotatably supported by said mounting body and spanning said flow path, said shaft defining a longitudinal axis thereof;
a plate-like flow modulator substantially spanning said flow path and being secured to said shaft so that said modulator rotates with said shaft when the latter is rotated about its longitudinal axis, said modulator having a high-pressure side adapted to face upstream and a low-pressure side adapted to face downstream, said longitudinal axis defining first and second sections of said modulator whereby if said modulator is in an open rotational position said first section is upstream from said axis and said second section is downstream from said axis, said first and second sections being circumscribed by leading and trailing edges, respectively, of said modulator, said modulator having a first protrusion located near said trailing edge and extending from said high-pressure side, said modulator having a second protrusion spaced from said leading edge and extending from said low-pressure side of said first section to a distance "h" determined in a direction perpendicular to said modulator, said leading edge cooperating with said longitudinal axis to define a central bisector of said modulator that is perpendicular to said longitudinal axis, said axis and said leading edge cooperating to define a distance "r" extending therebetween and along said bisector, the ratio of the distance "h" to the distance "r" being about 0.2, said second protrusion being spaced from said leading edge by an average distance "d", the ratio of the average distance "d" to the distance "r" being in a range extending from about 0.12 to about 0.18.

22. A butterfly valve, comprising:
a mounting body defining a flow path;
a shaft rotatably supported by said mounting body and spanning said flow path, said shaft defining a longitudinal axis thereof;
a plate-like flow modulator substantially spanning said flow path and being secured to said shaft so that said modulator rotates with said shaft when the latter is rotated about its longitudinal axis, said modulator having a high-pressure side adapted to face upstream and a low-pressure side adapted to face downstream, said longitudinal axis defining first and second sections of said modulator whereby if said modulator is in an open rotational position said first section is upstream from said axis and said second section is downstream from said axis, said first and second sections being circumscribed by leading and trailing edges, respectively, of said modulator, said modulator having a first protrusion located near said trailing edge and extending from said high-pressure side, said modulator having a second protrusion spaced from said leading edge and extending from said low-pressure side of said first section to a distance "h" determined in a direction perpendicular to said modulator, said leading edge cooperating with said longitudinal axis to define a central bisector of said modulator that is perpendicular to said longitudinal axis, said axis and said leading edge cooperating to define a distance "r" extending therebetween and along said bisector, the ratio of the distance "h" to the distance "r" being about 0.2, said first protrusion extending from said high-pressure side to a distance "k" determined in a direction perpendicular to said modulator, said distance "h" exceeding said distance "k".

* * * * *